Patented Feb. 22, 1927.

1,618,762

UNITED STATES PATENT OFFICE.

THOMAS H. LEAMING, DECEASED, LATE OF BUFFALO, NEW YORK; BY BERYL LEAMING, ADMINISTRATOR, OF BUFFALO, NEW YORK, ASSIGNOR TO NATIONAL ANILINE & CHEMICAL CO., INC. OF NEW YORK, N. Y., A CORPORATION OF NEW YORK.

COPPER AZODYESTUFFS.

No Drawing.  Application filed June 22, 1925. Serial No. 38,928.

This invention relates to the production of new copper compounds of substantive azodyestuffs which are of value for dyeing cotton and silk. The fabrics, or other material, dyed with the new dyestuffs also form a part of the present invention.

It is known that copper compounds of substantive azodyestuffs, hereinafter called "copper azodyestuffs", can be produced by treating with copper, or a compound of copper, and azodyestuff obtained by combining one or two molecules of diazotized 2-aminobenzoic acid or its derivatives, or one molecule of a diazotized 2-aminobenzoic acid and one molecule of another diazo compound, with one molecule of 5.5'-dihydroxy-2.2'-linaphthylamine-7.7'-disulfonic acid. These copper compounds have heretofore been prepared by adding an aqueous solution of copper sulphate to an aqueous solution of the azodyestuff, neutralizing with sodium carbonate the mineral acid set free in the resulting mixture, and subsequently salting-out, filtering off, and drying the copper azodyestuff.

According to the present invention, copper azodyestuffs having brighter shades and a greater affinity for vegetable fibers can be produced from the above mentioned azodyestuffs by subjecting the reaction mixture or product of said azodyestuffs with copper or copper salts to the action of caustic alkali in an aqueous medium, and subsequently isolating the copper azodyestuff thus produced.

In carrying out the invention, a solution of copper sulfate, or other soluble copper salt, is added to a neutral or slightly alkaline aqueous solution of an azodyestuff obtainable by coupling in the presence of sodium carbonate one or two molecules of diazotized 2-aminobenzoic acid or its derivatives, or one molecule of a 2-aminobenzoic acid and one molecule of another diazo compound, with one molecule of 5.5'-dihydroxy-2.2'-dinaphthylamine-7.7'-disulfonic acid and the mixture subsequently rendered alkaline, preferably at elevated temperature, by the addition of caustic alkali and the copper azodyestuff then salted out and separated in any suitable manner.

The following example will further illustrate the invention, but it will be understood that it is not limited thereto. The parts are by weight.

*Example.*—845 parts (one mole) of the dyestuff having the probable formula and

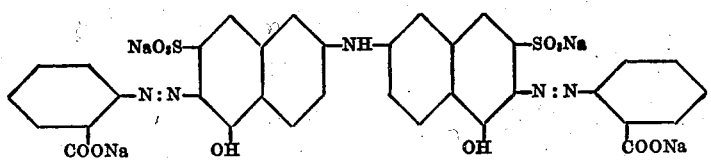

obtained by coupling in the presence of sodium carbonate two molecules of diazotized 2-aminobenzoic acid with one molecule of 5.5'-dihydroxy-2.2'-dinapthylamine-7.7'-disulfonic acid are dissolved in about 21,000 parts water at 85° C., and 499.5 parts (two molecules) crystallized copper sulfate are slowly added to this solution while stirring. The temperature of the mixture is maintained at about 85° C. for about one hour and the solution is then rendered alkaline by adding to it about 320 parts (eight moles) of caustic soda as a 10 percent aqueous solution. The copper dyestuff is then salted out at a temperature of about 85° C by the slow addition of common salt to the well stirred solution. About 4500 parts of common salt are usually required. The precipitated dyestuff is filtered off, pressed and dried.

The dyestuff thus obtained dyes cotton and silk reddish-violet shades which are brighter than those obtained when sodium carbonate is used as a neutralizing agent. It also has a greater affinity for vegetable fiber and consequently the dye-baths are more completely exhausted. In the dry and pulverized condition, the new copper azodyestuff is a dark powder soluble in water with a reddish-violet color and soluble in concentrated sulfuric acid with a brownish-red color which on dilution with ice-water turns blue and finally produces a bluish-red precipitate.

In the above example, the amount of copper sulfate employed can be varied; the use of less amounts than the amount of saturation with copper tend to produce dyestuffs giving redder shades while the use of the maximal amounts produce dyestuffs giving bluer shades. The copper sulfate can be added, if desired, in the form of an aqueous solution. The amount of water, of caustic alkali and of salt employed can also be varied over comparatively wide limits. The best effects are produced by the use of about two to five molecules of caustic alkali for each molecule of copper sulfate employed. Other ingredients capable of supplying copper under the stated conditions may be employed.

In the above example, the azodyestuff derived from the two molecules of 2-aminobenzoic acid and one molecule of 5.5'-dihydroxy-2.2'-dinaphthylamine-7.7'-disulfonic acid can be replaced by an equivalent amount of other azodyestuffs produced from one molecule of the latter acid in combination with one or two molecules of a diazo compound, one of which is diazotized 2-aminobenzoic acid or a derivative of the same.

It may be further pointed out that the copper azodyestuffs produced by processes wherein sodium carbonate, sodium acetate or other mineral acid binding agents are employed as the neutralizing agents, may upon treatment with caustic soda be subsequently converted to the copper dyestuffs of the present invention.

In the claims it will be understood that the term "I-acid imide" represents 5.5'-dihydroxy-2.2'-dinaphthylamine-7.7'-disulfonic acid; and that the term "anthranilic I-acid imide dyestuff" represents a dyestuff obtainable by combining in an alkaline medium one or two molecular proportions of diazotized 2-aminobenzoic acid or its derivatives, or one molecular proportion of diazotized anthranilic acid or derivative and one molecular proportion of another diazo compound with on molecular proportion of I-acid imide.

I claim:

1. A process of making a copper azodyestuff which comprises treating an aqueous solution of an anthranilic I-acid imide dyestuff with a copper salt, then adding sufficient caustic alkali to produce a caustic alkaline medium and subsequently salting out the copper azodyestuff.

2. A copper azodyestuff obtainable by the process as claimed in claim 1.

3. A process of making a copper azodyestuff which comprises treating an aqueous solution of a dyestuff produced by combining in the prescence of sodium carbonate two molecular proportions of diazotized 2-aminobenzoic acid with one molecular proportion of I-acid imide with a soluable copper salt, subsequently rendering the solution alkaline with caustic alkali, and then salting out the copper azodyestuff.

4. A copper azodyestuff obtainable by the process as claimed in claim 3.

5. A process of making a copper azodyestuff which comprises treating with copper sulfate a solution of the sodium salt of the disazo dye produced by combining two molecular proportions of diazotized anthranilic acid with one molecular proportion of I-acid imide, and subsequently rendering the solution strongly alkaline by the addition of caustic soda thereto and then salting out the copper azodyestuff, filtering it off and drying it.

6. A copper azodyestuff obtainable by the process as claimed in claim 5.

7. A process of making a copper azodyestuff which comprises adding caustic alkali in excess at elevated temperatures to an aqueous solution containing the reaction product of a copper salt and an anthranilic I-acid imide dyestuff, and subsequently salting out the copper azodyestuff.

8. The process according to claim 7 in which caustic soda and copper sulfate are respectively the caustic alkali and copper salt employed.

9. The process according to claim 7, in which caustic soda is the caustic alkali employed.

10. Material dyed with the copper azodyestuff of claim 2.

11. Material dyed with the copper azodyestuff of claim 4.

12. Material dyed with the copper azodyestuff of claim 6.

In testimony whereof I affix my signature.

BERYL LEAMING,
*Administrator of Thomas H. Leaming, deceased.*